US012606370B2

(12) United States Patent
Fagerland

(10) Patent No.: US 12,606,370 B2
(45) Date of Patent: Apr. 21, 2026

(54) AUTOMATED STORAGE AND RETRIEVAL SYSTEM

(71) Applicant: Autostore Technology AS, Nedre Vats (NO)

(72) Inventor: Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 758 days.

(21) Appl. No.: 17/995,003

(22) PCT Filed: Mar. 25, 2021

(86) PCT No.: PCT/EP2021/057821
§ 371 (c)(1),
(2) Date: Sep. 29, 2022

(87) PCT Pub. No.: WO2021/198036
PCT Pub. Date: Oct. 7, 2021

(65) Prior Publication Data
US 2023/0150766 A1      May 18, 2023

(30) Foreign Application Priority Data
Mar. 31, 2020     (NO) ................................... 20200391

(51) Int. Cl.
*B65G 1/04*          (2006.01)
*B65G 1/02*          (2006.01)
(52) U.S. Cl.
CPC ........... *B65G 1/0464* (2013.01); *B65G 1/026* (2013.01); *B65G 2201/0235* (2013.01)
(58) Field of Classification Search
CPC ............ B65G 1/026; B65G 2201/0235; B65G 1/045; B65G 1/0478; B65G 1/065;
(Continued)

(56) References Cited

U.S. PATENT DOCUMENTS 3,730,358 A      5/1973   Oji
6,269,937 B1 *   8/2001   Dietrich ................. B65G 21/22
                                                          198/845
(Continued)

FOREIGN PATENT DOCUMENTS

CN      109071192 A      12/2018
CN      110475730 A      11/2019
(Continued)

OTHER PUBLICATIONS

Search Report issued in Norwegian Application No. 20200391; Dated Oct. 31, 2020 (2 pages).
(Continued)

*Primary Examiner* — Timothy R Waggoner
(74) *Attorney, Agent, or Firm* — Baker Botts L.L.P.

(57)          ABSTRACT

A storage grid for storing storage containers includes a plurality of horizontal container supporting frameworks distributed vertically with vertical offsets. The plurality of horizontal container supporting frameworks includes a first container supporting framework and at least one second container supporting framework arranged beneath and parallel to the first container supporting framework. Each of the first and the at least one second container supporting frameworks includes a plurality of container supports arranged in parallel along a first direction. Each container support displays at least one hole with an opening size being at least a maximum horizontal cross section of the storage containers to be stored. The at least one hole of the first container supporting framework are aligned vertically with the at least one hole of the at least one second container supporting framework. At least two of the plurality of container supports of the at least one second container supporting framework are displaceable along a second direction orthogonal to the first direction.

18 Claims, 16 Drawing Sheets

(58) Field of Classification Search
CPC ...... B65G 1/0464; B65G 15/44; B65G 15/42;
B65G 35/04; B65G 25/065; B65G
2812/02613; A47B 49/004; A47B 49/006;
E04H 6/18
See application file for complete search history.

(56) References Cited

U.S. PATENT DOCUMENTS

| | | | | |
|---|---|---|---|---|
| 2018/0128532 | A1 | 5/2018 | Hognaland | |
| 2019/0009984 | A1* | 1/2019 | Hognaland | B65G 1/0485 |
| 2021/0032027 | A1* | 2/2021 | Fjeldheim | B65G 1/0485 |

FOREIGN PATENT DOCUMENTS

| | | | |
|---|---|---|---|
| CN | 209853076 | U | 12/2019 |
| DE | 19942584 | A1 | 3/2001 |
| EP | 0246214 | A2 | 11/1987 |
| EP | 0315263 | A1 | 5/1989 |
| GB | 1124673 | A | 8/1968 |
| JP | S4996463 | A | 9/1974 |
| JP | S59102706 | A | 6/1984 |
| JP | S63154502 | A | 6/1988 |
| JP | H04260514 | A | 9/1992 |
| JP | H0873013 | A | 3/1996 |
| JP | 2004-307125 | A | 11/2004 |
| JP | 2004307125 | A1 * | 11/2004 |
| JP | 2006-500302 | A | 1/2006 |
| JP | 2016-525490 | A | 8/2016 |
| NO | 317366 | B1 | 10/2004 |
| WO | 2014075937 | A1 | 5/2014 |
| WO | 2014090684 | A1 | 6/2014 |
| WO | 2015193278 | A1 | 12/2015 |
| WO | 2018146304 | A1 | 8/2018 |
| WO | 2019141877 | A1 | 7/2019 |
| WO | 2019238645 | A1 | 12/2019 |
| WO | 2019238703 | A1 | 12/2019 |

OTHER PUBLICATIONS

International Search Report issued in International Application No. PCT/EP2021/057821, mailed Jun. 15, 2021 (4 pages).

Written Opinion issued in International Application No. PCT/EP2021/057821; Dated Jun. 15, 2021 (6 pages).

Schneider, Marc, examining communication in European Patent Office application EP21716295.7, mailed Jul. 17, 2025, 5 pages, published by European Patent Office, Rijswijk, Netherlands.

Yao, Zhiwei, examining action in Chinese patent application CN202180039168.1, mailed Jun. 26, 2025, 24 pages, published by State Intellectual Property Office of the People's Republic of China, Beijing, China.

Hirokazu Moribayashi, Notice of Reasons for Rejection in Japanese Application No. 2022-559592, mailed Mar. 11, 2025, 4 pages (inclusive of translation), Japan Patent Office, Tokyo, Japan.

Yao Zhiwei, Notification of the First Office Action and Search Report in Chinese Application No. 2021800391681, mailed Mar. 10, 2025, 10 pages (inclusive of translation), the State Intellectual Property Office of the People's Republic of China, Beijing, China.

Marc Schneider, Examination Report for European Patent Application No. 21 716 295.7, mailed Feb. 7, 2025, 4 pages, European Patent Office, Rijswijk, Netherlands.

Uchida, Hiroyuki, examination action in Japan patent application 2022559592, mailed Sep. 3, 2025, 13 pages, pub. by Japan Patent Office, Tokyo, Japan.

Anonymous, Office action in Republic of Korea patent application 1020227037552, mailed Nov. 17, 2025, 21 pages, pub. by Korean Intellectual Property Office, Daejeon, Korea.

Izzat Bin Iskandar, Muhamad, Office action in Malaysia patent application PI2022005396, mailed Dec. 24, 2025, 5 pages, pub. by Intellectual Property Corporation of Malaysia, Kuala Lumpur, Malaysia.

* cited by examiner

301

301a

304

301c

301b

Y

X

Z

1

AUTOMATED STORAGE AND RETRIEVAL SYSTEM

FIELD OF THE INVENTION

The present invention relates to a storage grid, an automated storage and retrieval system for storage and retrieval of containers from/to such a storage grid. The present invention also relates to a method for storing and retrieving containers in such a storage grid to access deeper laying containers in a more time efficient manner.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the storage columns 105 are accessed by the container handling vehicles 201,301 through grid openings 115 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers 106 during raising of the containers out from, and lowering of the containers into, the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device 304 for vertical transportation of storage containers 106, e.g. raising a storage container 106 from, and lowering a storage container 106 into, a storage column 105. The lifting device 304 comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the lifting device 304 of the container handling vehicle 301 are shown in FIG. 3. The gripping device of the container handling device 201 is located within the vehicle body 201a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The possible storage positions within the framework structure/prior art storage grid 100 are referred to as storage cells. Each storage column 105 may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure/prior art storage grid 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device 304, and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

FIG. 4 shows examples of product items 80 stored in a storage container 106 having height $H_f$, a width $W_f$ and a length $L_f$.

For systems containing a large number of bins in each stack, the above mentioned 'digging' may prove both time and space consuming when the target bin is located deep within the grid. For example, if the target bin has location Z=5, the vehicle(s) must lift four non-target bins and place them in other positions, often on top of the grid (Z=0), before the target bin can be reached. Before being replaced back into the grid, the non-target bins may force other robots to choose non-optimized paths to execute their respective operations.

An objective of the present invention is therefore to provide a storage grid and a storage and retrieval system using such a storage grid which may provide a more time efficient storage and retrieval method compared to prior art systems, for example a more time efficient delivery of product items to a customer/end-user.

Another objective, at least in preferred embodiments, is to provide a solution where the picking process is performed by remotely operated vehicles without any kind of time consuming digging operations.

Yet another objective is to provide a storage and retrieval system in which the time efficiency of storing and retrieving product items can be selected by the user depending on urgency and/or priority.

Yet another objective is to provide a storage and retrieval system combining storage capacity with time efficient delivery of product items to a customer.

Yet another objective is to provide a storage grid and a storage and retrieval system using such a storage grid which may provide a high throughput of product items, such as product items on sale.

SUMMARY OF THE INVENTION

The invention is set forth in the independent claims and the dependent claims describe certain optional features of the invention.

In particular, the invention concerns a storage grid for storing storage containers. The storage grid comprises a plurality of horizontal container supporting frameworks distributed vertically with vertical offsets.

The plurality of horizontal container supporting frameworks comprise a first horizontal container supporting framework and at least one second container supporting framework arranged beneath and parallel to the first container supporting framework.

Each of the first and the at least one second container supporting frameworks comprises one or more container supports configured/designed to support a plurality of storage containers. If several, the container supports are preferably arranged in parallel along a first direction (X), i.e. with their sides extending in a second direction (Y) arranged side-by-side with offset.

The container support(s) may be elongated with its/their elongated direction in the second direction (Y). Alternatively, it/they may be squared with principal directions in the first and second directions (X,Y). In yet an alternative design, the container support(s) may have the shape of a toroid or a plurality of coaxially arranged toroids.

The storage containers are distributed one-by-one on the container support(s) within each container supporting framework. In case of an elongated or squared container supports, the storage containers are distributed one-by-one in line along at least the second direction (Y). In case of a toroid shaped container supports, the storage containers may be distributed one-by-one following the curve of the toroid(s).

Each container support displays at least one hole with an opening size being at least a maximum horizontal cross section of the storage containers to be stored. Furthermore, the storage grid is designed such that the at least one hole of the first container supporting framework are aligned vertically, i.e. with equal position in the first and second directions (X,Y), with the at least one hole of the at least one second container supporting framework.

At least one of the container support(s) of the at least one second container supporting framework, preferably at least two, and most preferably all, is/are displaceable along a second direction (Y) orthogonal to the first direction (X) in case of an elongated or squared container support, or around a center axis of the toroid(s) in case of toroid shaped container support(s). At least one of the container support(s) of the first container supporting framework may also be similarly displaceable.

A storage grid comprises a combination of elongated/squared shaped container supports and toroid shaped container supports may also be envisaged.

In an exemplary configuration, the storage grid further comprises a support displacement device configured to displace at least one, and preferably all, of the plurality of displaceable container supports. The support displacement device can for example be a linear actuator, gearwheel drive, or the like. The support displacement device may be motorized and/or may be mechanically, hydraulically, pneumatically and/or electrically operated.

In yet another exemplary configuration, the storage grid further comprises a control system configured to remotely operate the support displacement device such that the displaceable container support may be moved remotely. Or, in case of a plurality of displaceable container supports, each of the displaceable container supports may be moved remotely and independently to the other displaceable container supports within their respective container supporting framework.

In yet another exemplary configuration, the container support(s) displays a plurality of holes distributed evenly along the second direction (Y). However, any distribution of holes along the second direction (Y) may be envisaged, for example that the plurality of holes are distributed on either sides of four storage container spaces, then three spaces, then two, etc. The latter may have the advantage of offering different access rates for different type of stocks.

In yet another exemplary configuration, the first container supporting framework and the at least one second container supporting framework have equal or near equal horizontal extent.

In yet another exemplary configuration, the storage grid further comprises a rail system arranged above and adjacent to the first container supporting framework at a first vertical offset $V_{r1}$ being at least a maximum height of the storage containers to be stored. Said rail system may comprise a first set of parallel rails arranged in a horizontal rail system plane ($P_{rs}$) and extending in the first direction (X) and a second set of parallel rails arranged in the horizontal plane ($P_{rs}$) and extending in the second direction (Y). The first and second sets of rails form a grid pattern in the horizontal plane ($P_{rs}$) comprising a plurality of adjacent grid cells, wherein each of the grid cells comprises a grid opening defined by a pair of adjacent rails of the first set of rails and a pair of adjacent rails of the second set of rails.

In yet another exemplary configuration, the container supports are either elongated or squared, where each of them has a length corresponding to the length of a plurality of grid cells in the second direction (Y). In one specific example, the width of the container supports is such that only one storage container may be supported along the first direction (X).

In yet another exemplary configuration, the rail system, the first container supporting framework and the at least one second container supporting framework have equal or near equal horizontal extents.

In yet another exemplary configuration, the plurality of horizontal container supporting frameworks comprise a number of i parallel container supporting frameworks in the horizontal plane ($P_{rs}$), where i is an integer of 2 or more, more preferably 3 or more, even more preferably 4 or more. Further, the i parallel container supporting frameworks are arranged at a distance $dV=i*\Delta dV$ below a lower edge of the rail system, where $\Delta dV$ is a constant that is set equal or higher than a maximum height of the storage container (106) to be stored. Alternatively, i−1 parallel container supporting frameworks are arranged at a distance $dV=(i-1)*\Delta dV$ below 7                                                                                  8 a lower edge of the first container supporting framework, while the distance $V_{r1}$ between the lower edge of the rail system and the lower edge of the first supporting framework is different from $\Delta dV$, for example larger.

In yet another exemplary configuration, one or more of the container supporting frameworks is/are arranged at a distance below a lower edge of an above adjacent rail system and/or a lower edge of an above adjacent container supporting framework, corresponding to a height that is equal or higher than a maximum height of a stack of several storage containers In yet another exemplary configuration, each of the plurality of displaceable container supports displays a plurality of holes distributed with an offset corresponding to 2n+1 grid cells along the second direction (Y), where n is an integer of 1 or more.

In yet another exemplary configuration, each of the plurality of displaceable container supports displays a plurality of holes distributed with an offset corresponding to n+1 grid cells along the second direction (Y), where n is an integer of 1 or more.

In yet another exemplary configuration, the displaceable container support is displaceable a distance corresponding to at least the distance of n grid cells in the second direction (+Y), where n is an integer of 1 or more. In case of a plurality of displaceable container supports, each may be individually displaceable a distance corresponding to at least the distance of n grid cells.

The invention also concerns an automated storage and retrieval system configured to store a plurality of storage containers. The system comprises a storage grid as described above, a plurality of storage containers supported, and distributed horizontally one-by-on, on the plurality of horizontally arranged container supporting frameworks, one or more remotely operated vehicles configured to move laterally/horizontally in the first direction (X) and the second direction (Y) above the plurality of container supporting frameworks, wherein the remotely operated vehicle(s) comprises a lifting device configured to grab and lift a storage container and a control system configured to monitor and control wirelessly movements of the remotely operated vehicle(s).

In an exemplary configuration, the remotely operated vehicle(s) may be a travelling crane system comprising a bar movably supported at its ends on two opposite peripheral sides of the storage grid along one of the first and second directions (X,Y) and a crane with a lifting device as described above, movably arranged onto the bar. The movement along the bar ensures movement in the other direction (Y,X) and can be achieved by sliding or rolling. The movement of the bar along the peripheral sides of the storage grid and/or the movement of the crane along the bar may be achieved by any known displacement device such as an arrangement using drive gear. The displacement device may be identical to the support displacement device used to displace the container supports as described above.

In another exemplary configuration, the storage grid comprises a rail system as described above. In this particular configuration the storage containers are supported on the horizontally arranged container supporting frameworks in such a way that each storage container is positioned directly below a grid opening of the rail system. Furthermore, the remotely operated vehicle is configured to move laterally in the first direction (X) and the second direction (Y) on the rail system and to lift the storage container through the grid opening by use of the lifting device.

In yet another exemplary configuration, the automated storage and retrieval system may further comprise a second storage grid comprising a second rail system comprising a first set of parallel rails arranged in the horizontal rail system plane ($P_{rs}$) and extending in a first direction (X) and a second set of parallel rails arranged in the horizontal rail system plane ($P_{rs}$) and extending in a second direction (Y) which is orthogonal to the first direction (X). The first and second sets of rails form a grid pattern in the horizontal plane ($P_{rs}$) comprising a plurality of adjacent grid cells, wherein each of the grid cells comprises a grid opening defined by a pair of adjacent rails of the first set of rails and a pair of adjacent rails of the second set of rails.

The second storage grid further comprises a plurality of stacks of storage containers arranged in storage columns located beneath the second rail system, wherein each storage column is located vertically below a grid opening.

In this exemplary configuration, the remotely operated vehicle(s) operable on the inventive storage grid is/are configured to also move laterally (in the horizontal plane $P_{rs}$) on the second rail system.

In yet another exemplary configuration, the system further comprises a coupling rail system comprising rails extending in at least one of the first direction (X) and the second direction (Y) and configured such the remotely operated vehicle(s) may move between the rail system of the inventive storage grid and the second rail system of the second storage grid. For example, the coupling rail system may be identical to a part of the rail system of the inventive storage grid and/or a part of the rail system of the second storage grid, wherein the rails of the coupling rail system oriented in the first or second direction (X,Y) are aligned with the rails of the two rail systems in the same direction.

In yet another exemplary configuration, the width of the rails in at least one of the first and second directions (X,Y) of the rail system forming part of the inventive storage grid is larger than the width of the rails in the same direction(s) of the rail system forming part of the second storage grid.

By combining the prior art grid and the inventive grid as described above, a storage system is achieved that may combine a time efficient storage and retrieval storage grid with a high storage capacity storage gird. The product items can thereby be arranged according to their needed/preferred turnover.

For example, the storage container with the product items can be picked from the prior art high storage capacity storage grid and stored (buffered) intermediately into the inventive time efficient storage grid. The product items may be items that needs to be swiftly available such as preordered items and/or campaign (sale) items. The storage (buffering) in the inventive storage grid renders time efficient delivery of product items to the customer possible at arrival.

The invention also concerns a method for storing and retrieving storage containers from an automated storage and retrieval system as disclosed above.

The plurality of horizontal container supporting frameworks comprises a number of i parallel container supporting frameworks, where i is an integer of 2 or more. Further, all i parallel container supporting frameworks displays at least one hole, and each of the at least i–1 parallel container supporting frameworks beneath the first (topmost) framework comprises at least one, preferably at least two, container support(s)/supporting track(s) being displaceable along the second direction (Y).

The method comprises the following steps:
A. moving the remotely operated vehicle(s) to a position where its/their lifting device is positioned in vertical alignment above either a target storage container supported on the first container supporting framework or, if the target storage container is situated on one of the i–1 parallel container support frameworks in vertical alignment (i.e. the same position in the first and second directions (X,Y)) beneath the first container supporting framework, a target hole of the first container supporting framework located horizontally closest to the target storage container, B. if the target storage container is not positioned in vertical alignment below the target hole, a) displacing the displaceable container support of the supporting framework onto which the target storage container is supported in the second direction (Y) to position the target storage container in vertical alignment below the target hole of the first container supporting framework or b) if also at least one, preferably at least two, of the plurality of container supports of the first container supporting framework are displaceable along the second direction (Y), displacing displaceable container support(s) of the container support framework(s) situated above the target storage container supporting displaceable container support, where one of the displaceable container support(s) of each of the above situated container supporting framework(s) has the same position in the first direction (X) as the target storage container supporting displaceable container support, a distance in the second direction (Y) opposite the direction in a), to position the target storage container in vertical alignment below the target hole of the first container supporting framework or c) if at least one, preferably at least two, of the plurality of container supports (402a-d) of the first container supporting framework (401a) are displaceable along the second direction (Y), displacing both the target storage container supporting displaceable container support as described in step a) and the above situated displaceable container support(s) as described in step b) to position the target storage container in vertical alignment below the target hole, C. lowering, grabbing and lifting the target storage container by use of the lifting device, e.g. through a grid opening, and D. moving the remotely operated vehicle(s) with the target storage container to another horizontal location on top of the storage grid.

Note that, for step B, part step b), since all holes are initially in vertical alignment (same position in first and second directions (X,Y), placing the container support with the target hole of the first container supporting framework vertically aligned with the target storage container result in the vehicle has an unobstructed, vertical, access to the target storage container.

In an exemplary process, the storage grid used in the method further comprises a rail system as described above, wherein the plurality of storage containers are supported on the plurality of horizontally arranged container supporting frameworks such that each storage container is positioned directly below a grid opening of the rail system. Furthermore, the remotely operated vehicle(s) is/are configured to move laterally in the first direction (X) and the second direction (Y) on the rail system and to lift the storage container through the grid opening by use of the lifting device. As an alternative to remotely operated vehicle(s)

operating on such a rail system, the method may use a system of transverse cranes as described above.

In another exemplary process, the automated storage and retrieval system further comprises a second rail system of a second storage grid, a rail system of an inventive storage grid and a coupling rail system as described above, wherein the remotely operated vehicle(s) moves between the rail system and the second rail system during at least one of step A and step D.

The invention also concerns use of an automated storage and retrieval system as disclosed above for delivering items arranged within the storage containers stored in the storage grid to end users, for example by use of conveyor belts transporting the storage containers, or dedicated delivery containers initially stored within the storage containers, from the storage grid to a location for loading onto delivery trucks and/or directly to customer/end users. The system may for example be used in a retail shop for swift delivery of items to customers.

BRIEF DESCRIPTION OF THE DRAWINGS

The following drawings depict alternatives of the present invention and are appended to facilitate the understanding of the invention. However, the features disclosed in the drawings are for illustrative purposes only and shall not be interpreted in a limiting sense.

FIG. 5D shows the storage system with the remotely operated vehicle ready to lift the target storage container and FIG. 5E shows the storage system with the target storage container in a position ready to be lifted.

DETAILED DESCRIPTION OF THE INVENTION

Figure 1:
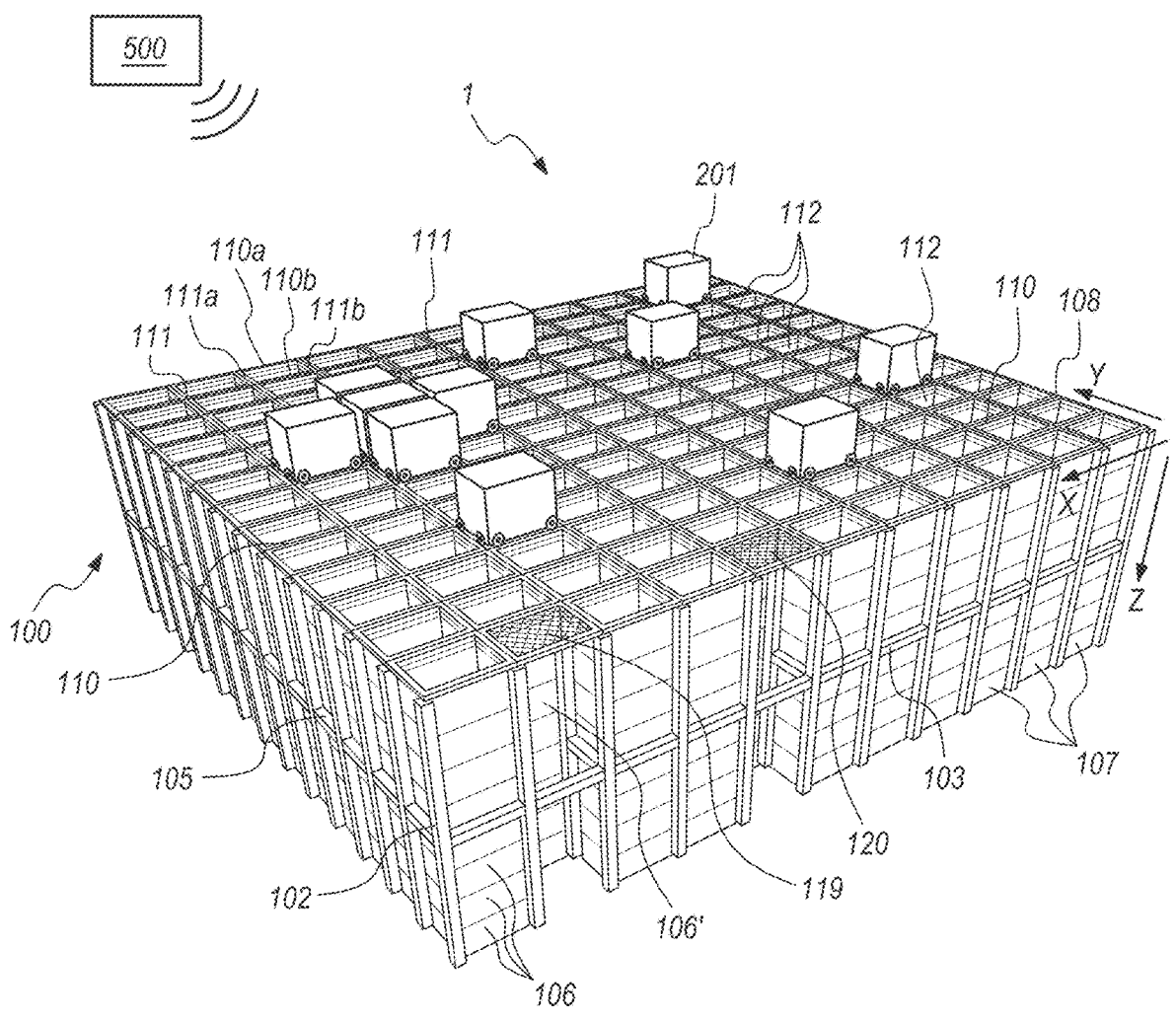
FIG. 1 is a perspective view of a prior art automated storage and retrieval system.

In the following, different alternatives will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the methods as well, and vice versa.

Figure 5A:
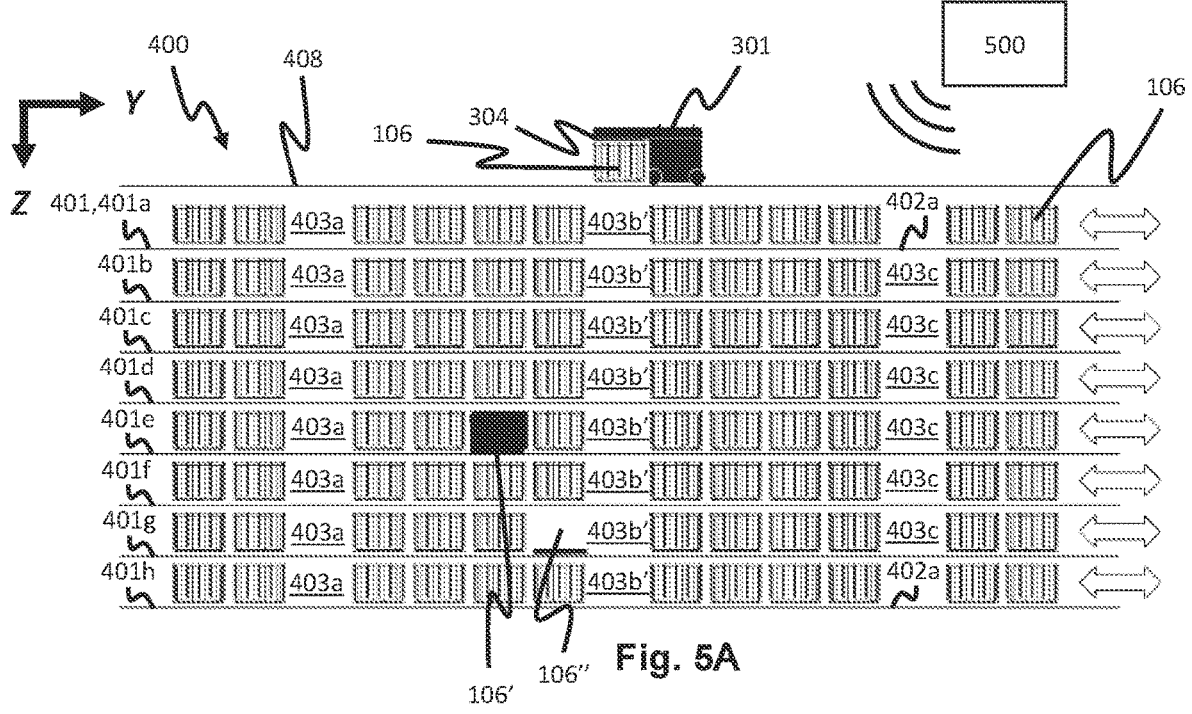
FIG. 5A shows the storage system with a target storage container in an initial position, a vacant storage cell for a storage container in an initial position and a remotely operated vehicle carrying a storage container.
Figure 5B:
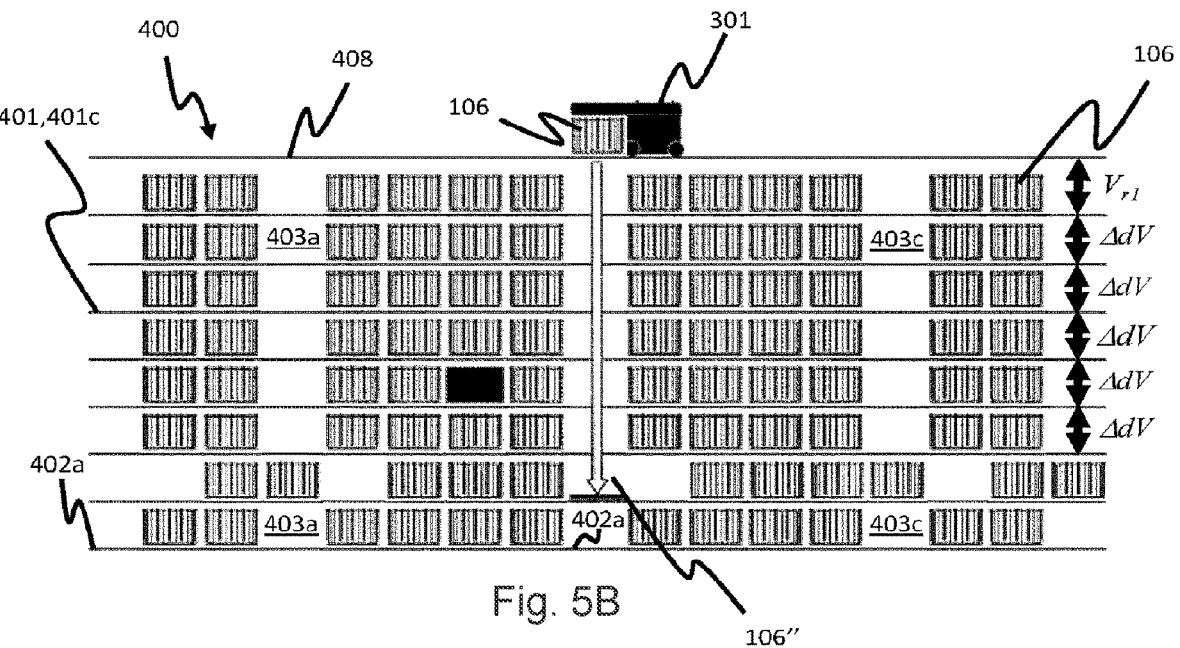
FIG. 5B shows the storage system with the vacant storage cell in a position ready to receive the storage container from the remotely operated vehicle.
Figure 5C:
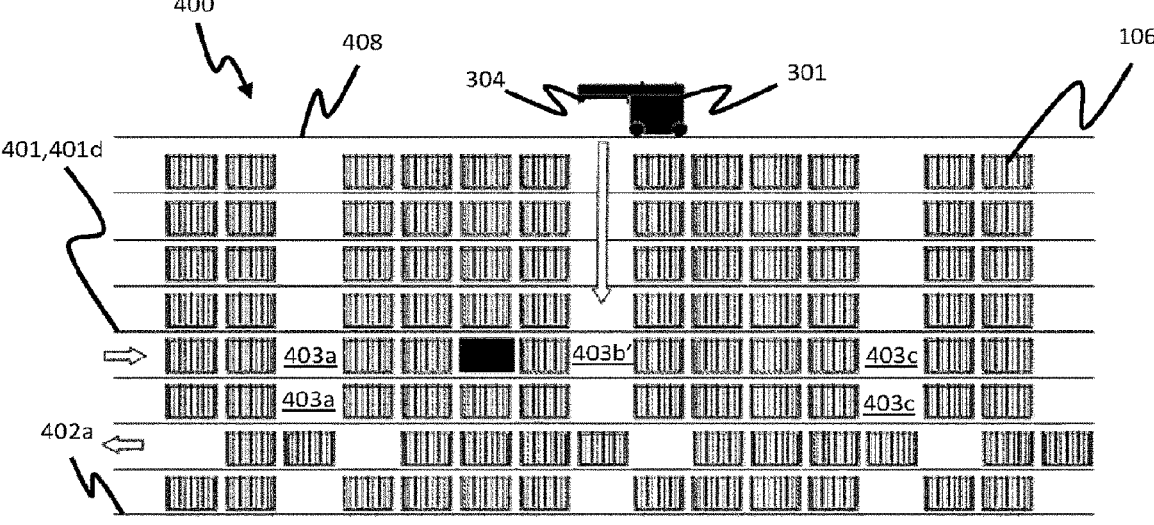
FIG. 5C shows the storage system where the storage container is placed in the previously vacant storage cell and a lifting device of the remotely operated vehicle is retracted above the container supporting framework of the target storage container.
Figure 5:
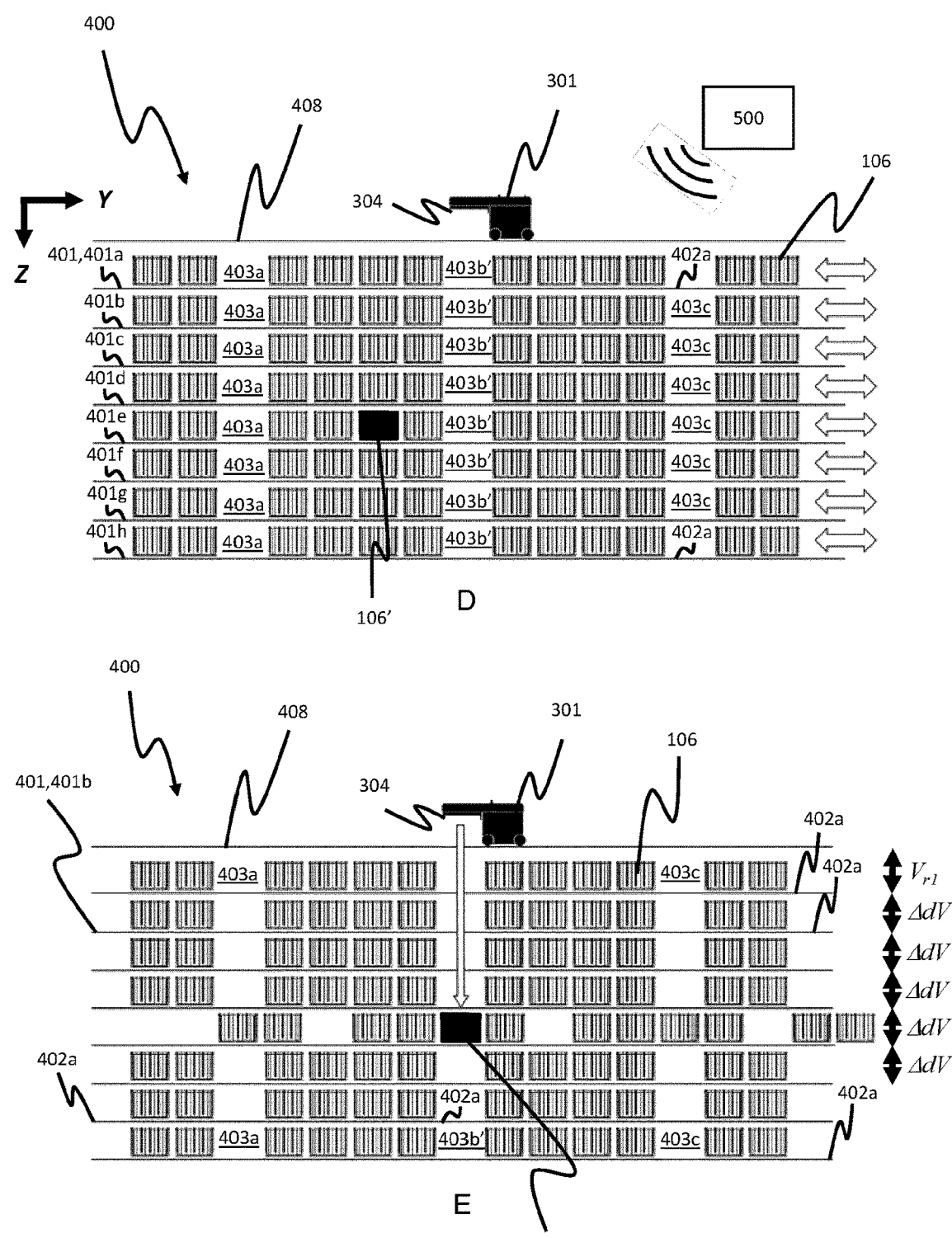
FIG. 5 is a side view of a storage system in accordance with one embodiment of the invention, where
Figure 6:
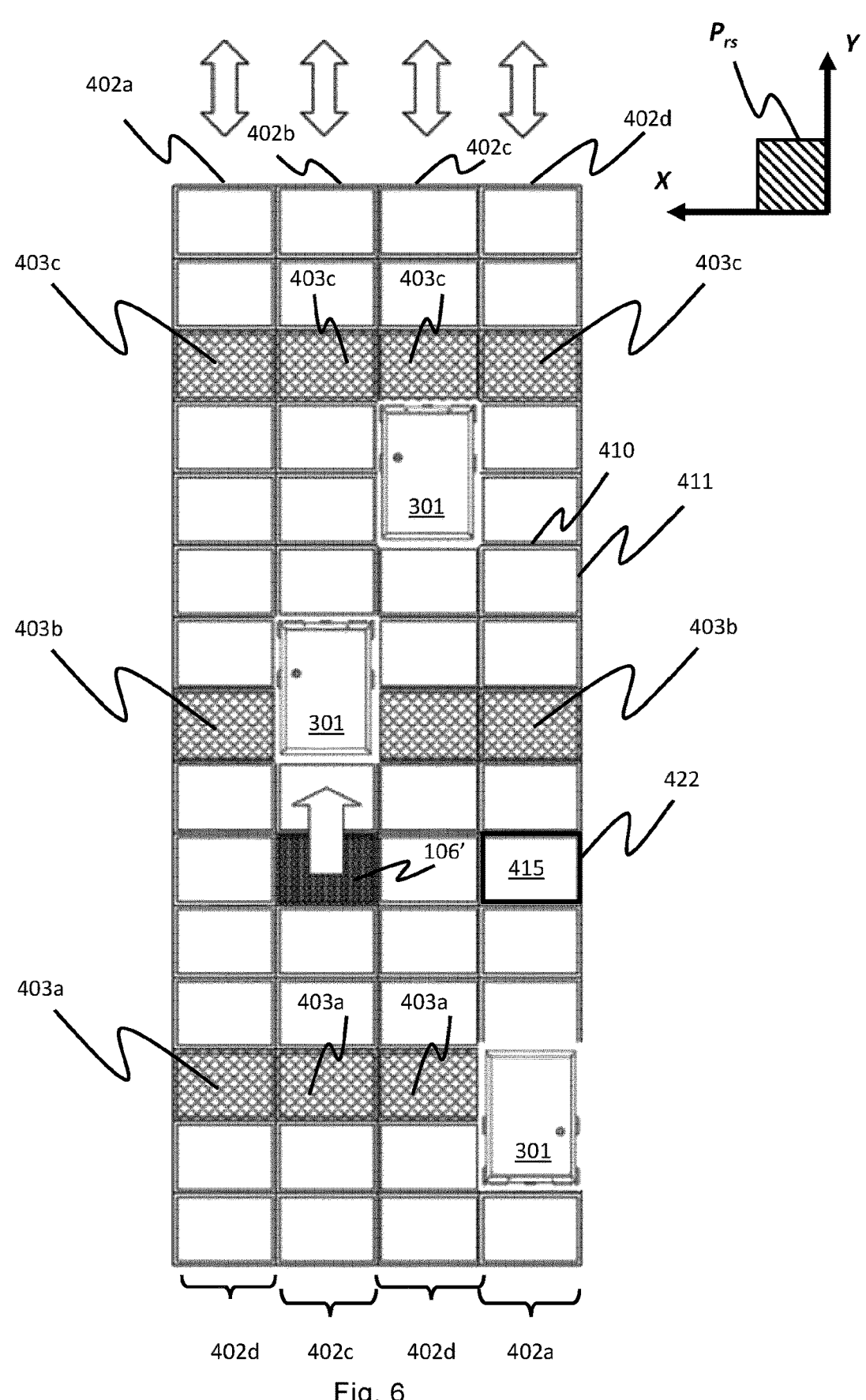
FIG. 6 is a top view of a storage system in accordance with the storage system of FIG. 5.
Figure 14:
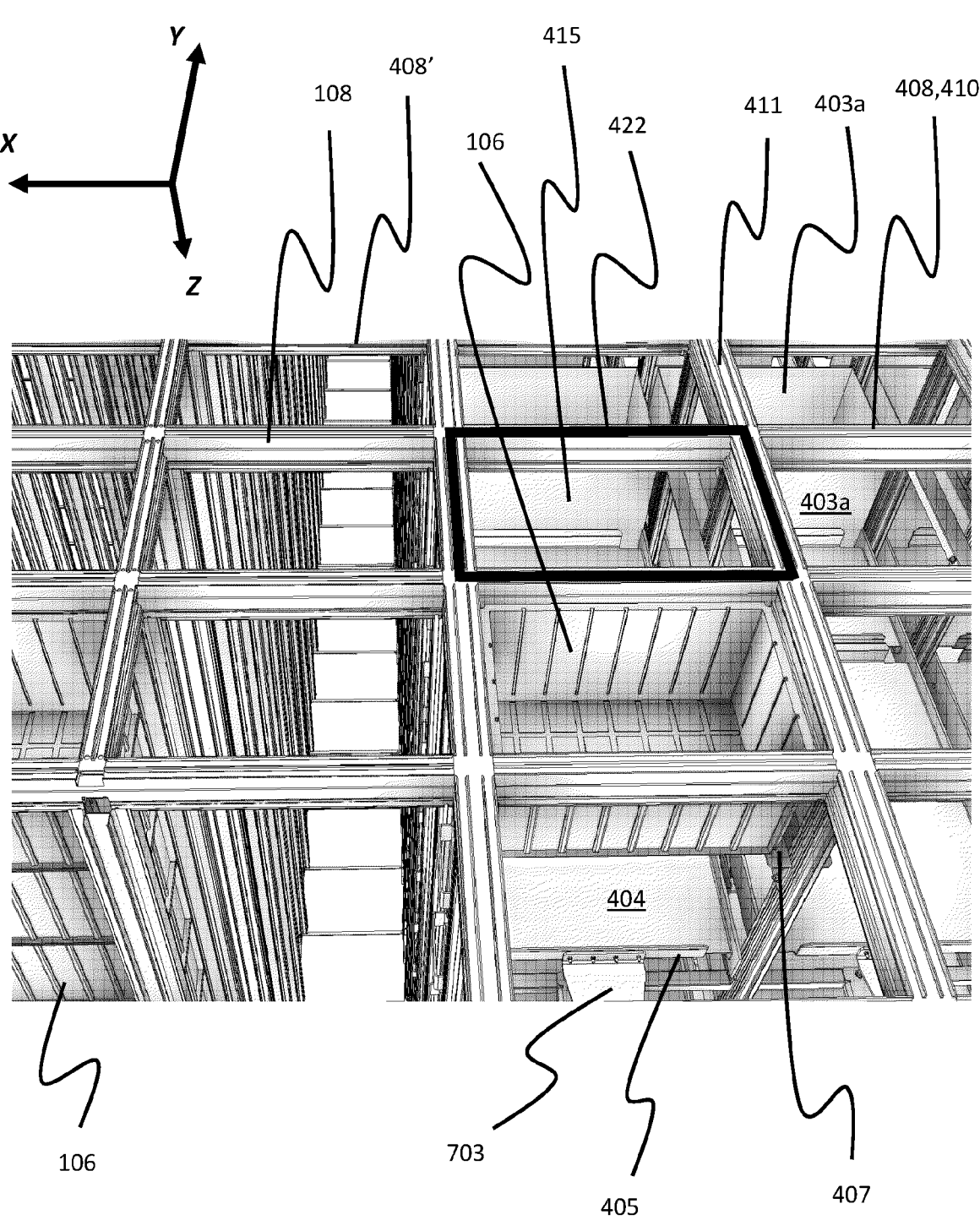
FIG. 14 is a perspective top view of a storage system according to a fourth embodiment of the invention.

With particular reference to FIG. 5, FIG. 6 and FIG. 14, the inventive storage and retrieval system 1 comprises remotely operated vehicles 301 operating on a rail system 408 comprising a first set of parallel rails 410 arranged to guide movements of the remotely operated vehicles 301 in a first direction X across a storage grid 400 and a second set of parallel rails 411 arranged perpendicular to the first set of rails 410 to guide movement of the remotely operated vehicles 301 in a second direction Y which is perpendicular to the first direction X. The storage containers 106 stored within the storage grid 400 are accessed by the remotely operated vehicles 301 through grid openings 415 in the rail system 408. Each grid opening 415 of the rail system 408 is enclosed by a grid cell 422. The rail system 408 extends in a horizontal plane $P_{rs}$.

As best seen in FIG. 5, the storage containers 106 are stored on a plurality of frameworks 401 distributed in a Z direction below the rail system 408 with a vertical offset indicated by $V_{r1}$ (i.e. the offset between the lower edge of the rail system 408 and the lower edge for the first framework 401a directly beneath the rail system 408) and a vertical offset indicated by ΔV (i.e. the average offset between the lower edges of the adjacent deeper laying frameworks 401b-h).

The vertical offsets $V_{r1}$ and ΔV may be selected to provide a height that is equal or higher than a maximum height of one storage container 106 or a stack 107 of several storage containers 106. As an example, the first framework 401a may be adapted to store stacks 107 of storage containers 106 while the below situated frameworks 401b-k may be adapted to store single (unstacked) storage containers 106. As a further example, several or all frameworks 401 of the grid 400 may be adapted to store stacks 107 of several storage containers 106. The different frameworks 401 of the same grid 400 may be configured to store stacks 107 of unequal numbers of storage containers 106. The vertical space (i.e. the available height) required for one or several frameworks 401 of the grid 400 to be adapted to store a stack 107 of several storage containers 106 may be obtained by reducing the total number of frameworks 401 as compared to a configuration of the grid 400 where all frameworks 401 are adapted to store single (unstacked) storage containers 106. FIG. 5A-E show vertical cross-sections of the storage system 400.

In 5A, a target storage container 106' and a vacant storage space 106'' are located in different container supporting frameworks 401e,401g. The remotely operated vehicle 301 approaching to pick the target storage container 106' typically brings another storage container 106 that is to be stored in the storage system 400. Before the remotely operated vehicle 301 can pick the target storage container 106', the vehicle held storage container 106 is advantageously placed in a vacant storage space 106'' within the storage grid 400 (a process typically referred to as an exchange process).

By having less storage containers 106 than there are available container spaces within the storage system 400, there will always be at least one vacant storage space 106''. Vacant storage spaces 106'' will also be dynamically generated as remotely operated vehicles 301 pick storage containers 106 from within the storage grid 400. If there are no vacant storage spaces 106'' in the storage system 400, the remotely operated vehicle 400 must either refrain from bringing another storage container 106 from for example the port column 119,120 or place the held storage container 106 on top of the storage grid 400. Both alternatives suffers disadvantages in respect of time efficiency.

FIG. 5B shows the storage system 1 with the vacant storage space 106'' in a position ready to receive the storage container 106 from the remotely operated vehicle 301. The vacant storage space 106'' (into which the storage container 106 is to be placed) and the target storage container 106' are preferably horizontally closest to the same hole target 403b'. In this way the remotely operated vehicle 301 does not need to move between the two operations during the same exchange process. Even more preferred, in addition to being available through the same target hole 403b', the vacant storage space 106'' and the target storage container 106' can be located on the same container support 402 (not shown in FIG. 5). In this way the remotely operated vehicle 301 can have a minimum movement of its lifting device 304 between the two operations of the exchange process. Thus, the exchange process time will not be prolonged due to conflicting displacements of the lifting device 304 and the container support 402 of the target storage container 106'.

FIG. 5C shows the storage system 1 where the storage container 106 earlier held by the vehicle 301 has been received within the previously vacant storage space 106''. Further, the lifting device 304 has been retracted vertically above the container supporting framework 401e of the target storage container 106'. Consequently, the lifting device 304 has been sufficiently retracted so that displacement of the container support 402a of the target storage container 106' can start and continue until the target storage container 106' is situated beneath the target hole(s) 403b'. If the lifting device 304 is retracted higher than just above the container supporting framework 401e of the target storage container 106', the exchange process would become less time efficient.

In FIG. 5A-B, the target storage container 106' is located higher within the storage system 400 than the vacant storage space 106''. In the opposite case, the container support 402 of the previously vacant storage space 106'' must retract to its initial position after having completed its displacement of the target storage container 106' to the target hole 403' in order for the lifting device 304 to get access to lower situated container supporting frameworks 401.

FIG. 5D shows the storage system 1 with the remotely operated vehicle 301 ready to lift the target storage container 106' after placing the formerly held storage container 106 into the vacant storage space 106'', i.e. with its lifting device 304 just above the framework 401e supporting the target storage container 106'. The container support 402a of the previously vacant storage space 106'', now occupied by the storage container 106, has been displaced back to its initial position. Displacement of the container support 402a of the target storage container 106' may now start to place the target storage container 106' beneath the target hole(s) 403b'.

FIG. 5E shows the storage system 1 with the target storage container 106' presented beneath the target hole(s) 403b', i.e. in a position ready to be lifted by the lifting device 304 of the vehicle 301.

After the target storage container 106' has been lifted above the container supporting framework 401e, the container support 402a can be displaced back to its initial position.

Figure 4:
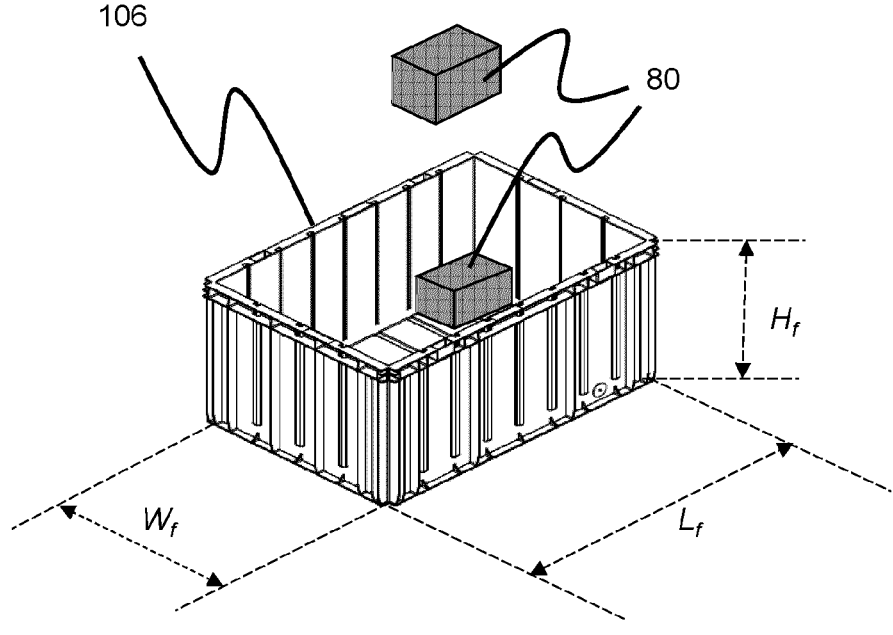
FIG. 4 is a perspective view of a storage container and product items stored in the storage container.

For the specific embodiment depicted in FIGS. 5 and 6, each of the frameworks 401a-k comprises several elongated container support 402a-d having their longitudinal orientation in the Y direction and arranged parallel to each other in the X direction. The container supports 402a-d in each framework 401a-k displays holes 403a-f distributed along the Y direction, where each hole 403a-c has a cross sectional being at least the cross-sectional area of a storage container 106, i.e. at least $W_f \times L_f$ (see FIG. 4). The storage containers 106 are placed on top of support plates 404 between these holes 403a-c. Each storage container 106 is stabilized in the horizontal plane $P_{rs}$ by first stabilization ribs 405 along the X direction and second stabilization ribs 406 along the Y direction. The first stabilization ribs 405 protrude upwards from both X directed sides of each of the support plates 404, thereby preventing each storage container 106 to move along the Y direction relative to the container support 402b. Further, the second stabilization ribs 406 extend along the full length of the container support 402b in the Y direction having a part that protrudes above the support plates 404, thereby preventing each storage container 106 to move in the X direction relative to the container support 402b.

Figure 10:
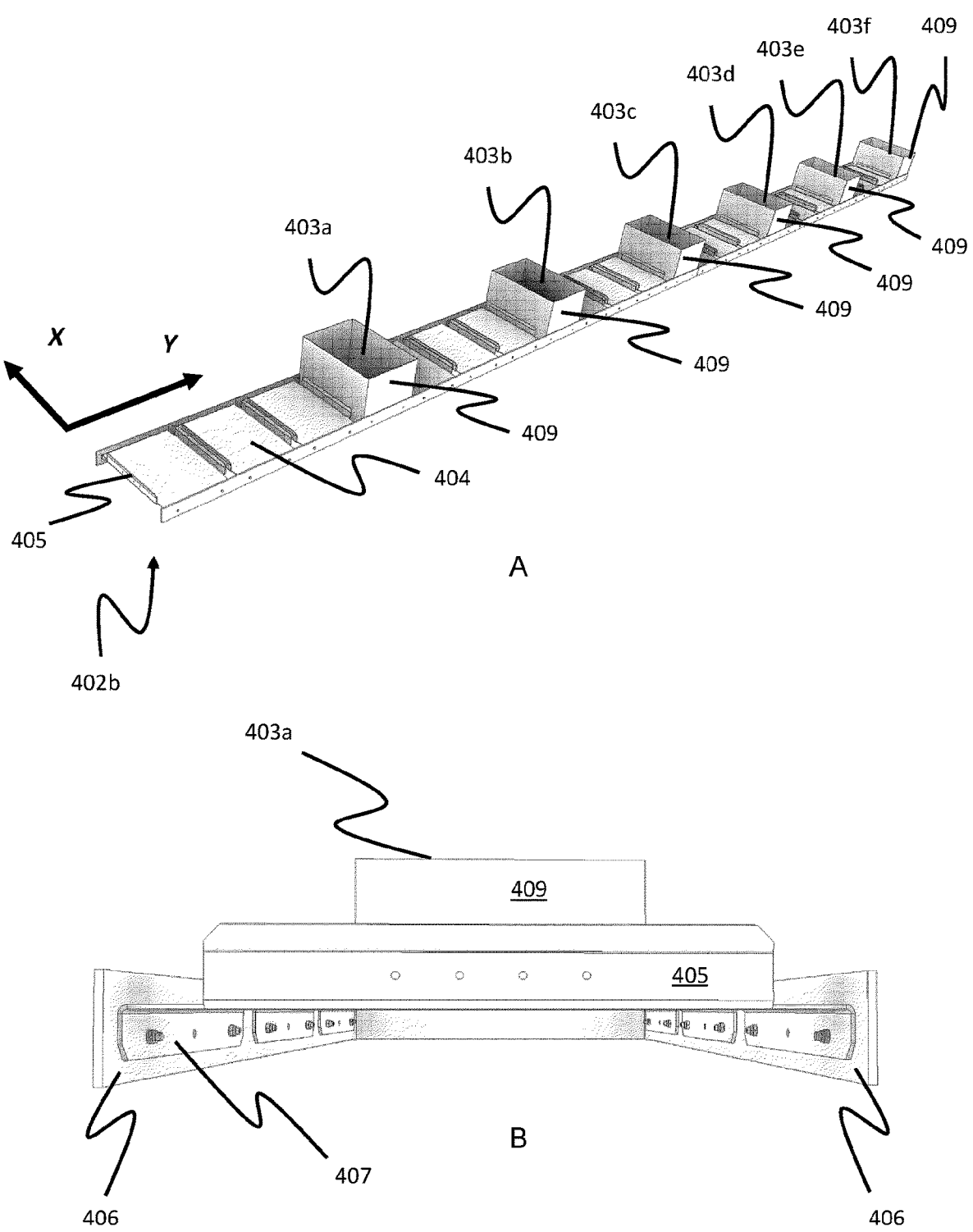
FIG. 10 are perspective views of a container support forming part of an embodiment of the invention, where FIG. 10 A and FIG. 10 B show the container support in an isometric view and along one end, respectively.

An example of such a container support design is shown in FIG. 10. The container support 402b has an elongated shape extending in the Y direction and a width in the X direction allowing one storage container 106 having with $W_f$. Each storage container 106 is constrained in X and Y directions by the above-mentioned stabilization frames 405, 406. The container support 402b displays a hole 403a-f along the Y direction after each third storage container space, wherein each of the holes 403a-f has a width and length in the X and Y directions, respectively, being approximately the width ($W_f$) and length ($L_f$) of the storage container 106. In this particular confirmation of the container supports 402b, a storage container guiding structure 409 in form of a bottomless box is fixed along the peripherals of each hole 403a-f in order to aid the storage container to be guiding correctly through the hole 403a-f during lifting/lowering by the respective vehicles 301.

Each sides of the support plates 404 are fastened by brackets 407 onto the second stabilization ribs 406.

In order to store and retrieve a target storage container 106' using the above described embodiment, the following operations are performed, with particular reference to FIGS. 5D and E:

The control system 500 gives instructions to the vehicle 301 to pick up a target storage container 106' with coordinates X,Y,Z. This position corresponds to a storage container 106 supported on a support plate 404 of a container support 402a forming part of a horizontal container support framework 401e at a depth of 3×ΔdV+Vr1 below the rail system 408. The target storage container 106 is separated in the Y direction to a nearest hole 403b' (i.e. the target hole) by one non-target storage container 106. Since all the holes in the storage grid 400 are initially aligned (with same X-Y coordinates), the X-Y position of the target hole 403b' of the container support framework 401a adjacent the rail system 408 is equal to the X-Y positions of the target holes 403b' of the underlying container support frameworks 401b-h.

The vehicle 301 moves by aid of its drive means 301b,c in the X and Y directions until its lifting device 304 is located directly above the target hole 403b' situated closest in horizontal direction to the target storage container 106'.

During and/or after movement of the vehicle 301 to the position above the target hole 403b', the control system 500 sends an instruction to a support displacement device 700 (see FIG. 11) to displace the container support 402a of the container framework 401e a sufficient distance in the Y direction so that the target storage container 106' is vertically aligned with the target holes 403b' of the above situated container frameworks 401a-d.

During and/or after the displacement of the container support 402a, the lifting device 304 of the vehicle 301 is activated and lowered down through the grip opening 415 and the aligned target holes 403b' until the gripping part of the lifting device 304 is in position to grip the target storage container 106.

After the target storage container 106' has been gripped by the lifting device 304 and lifted above the above situated container framework 401d, the support displacement device 700 is again activated in order to move the container support 402a back to its initial Y position.

When the target storage container 106' has been lifted above the rail system 408, the vehicle 301 is moved to another location on the rail system 408, for example to a dedicated port column/chute 436 for delivery to an access station 436.

The process has the advantage that the need for digging performed for prior art storage and retrieval system is no longer necessary.

Figure 2:
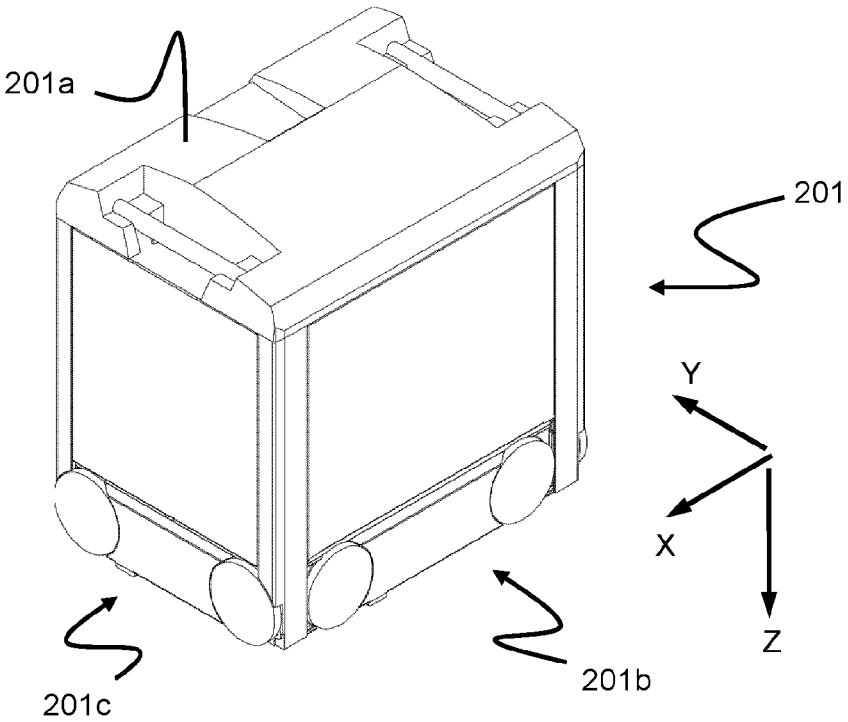
FIG. 2 is a perspective view of a prior art container handling vehicle having a centrally arranged cavity for carrying storage containers therein.
Figure 3:
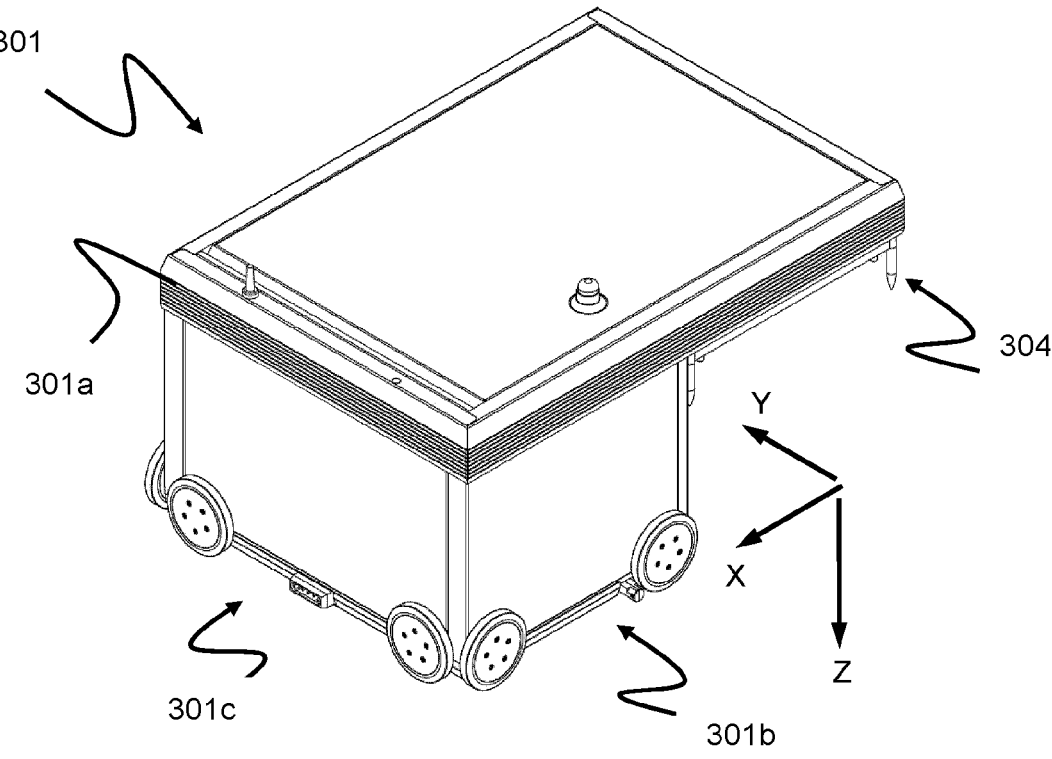
FIG. 3 is a perspective view of a prior art container handling vehicle having a cantilever for carrying storage containers underneath.
Figure 7:
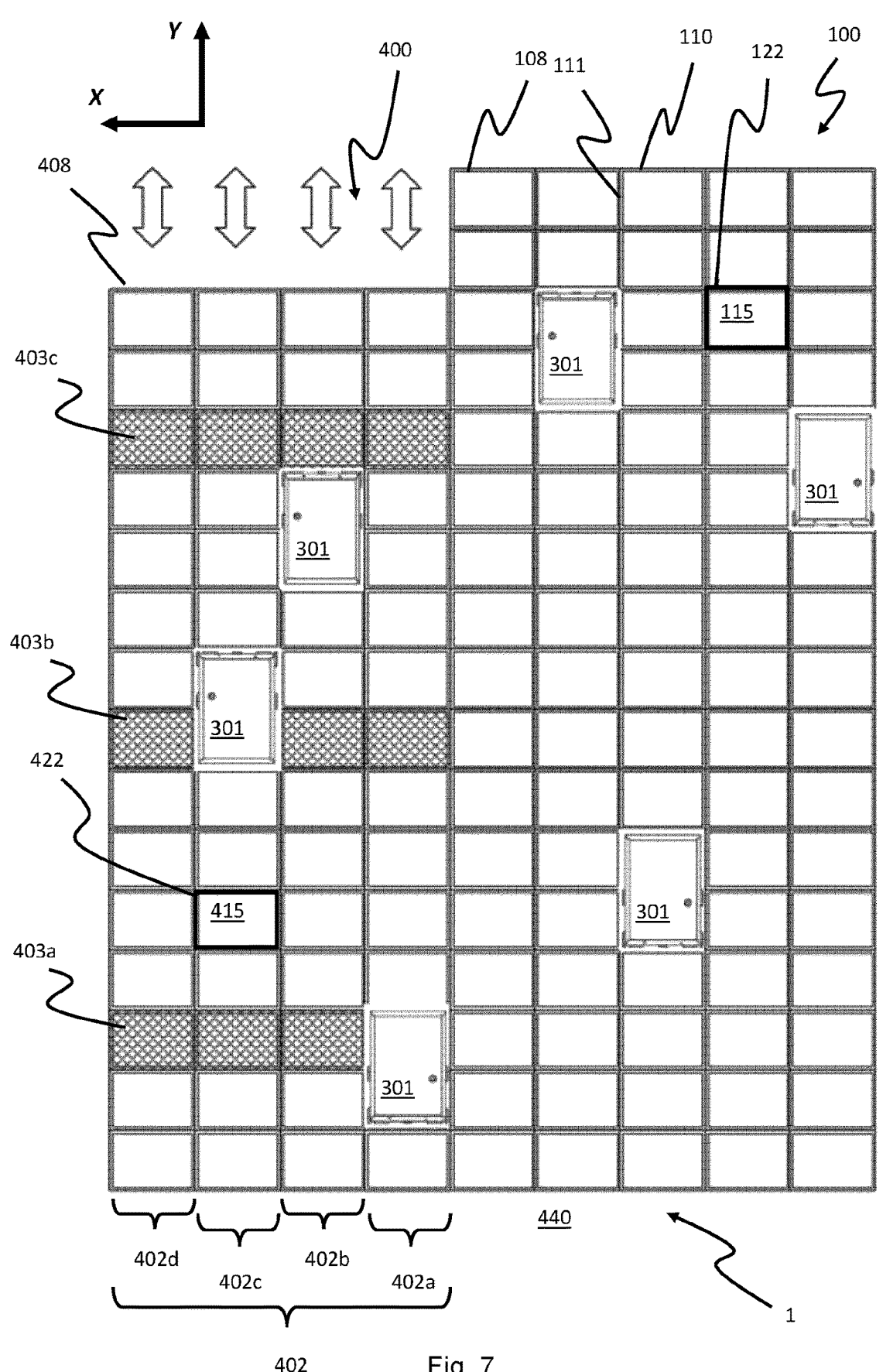
FIG. 7 is a top view of a storage system in accordance with a second embodiment of the invention.
Figure 8:
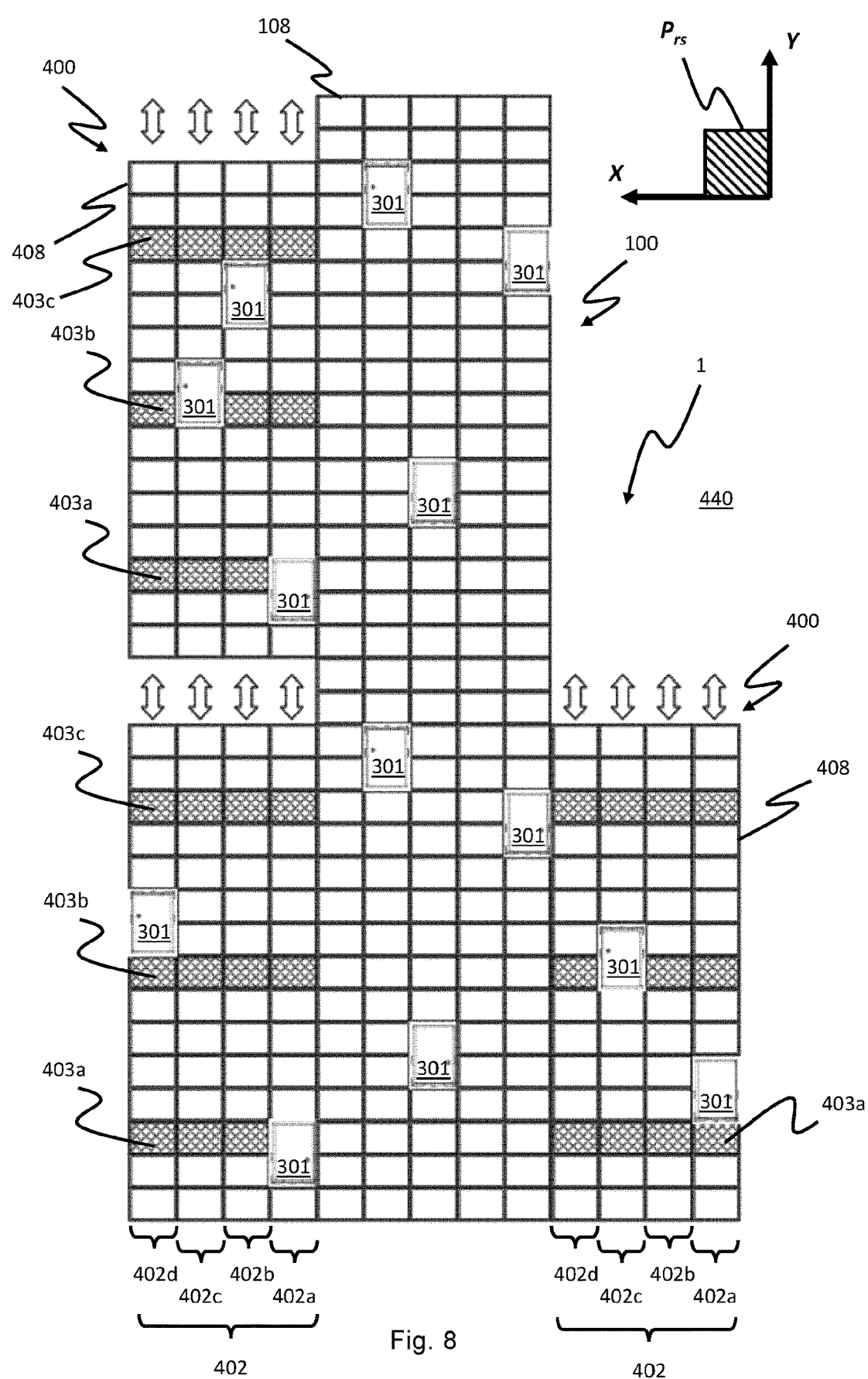
FIG. 8 is a top view of a storage system in accordance with a third embodiment of the invention.

FIG. 7 and FIG. 8 show another embodiment of the inventive system 1, where the inventive storage grid 400 is placed adjacent to a prior art storage grid 100. The prior second storage grid 100 is constructed in accordance with the storage grid 100 described above in connection with FIGS. 1-3, i.e. a number of upright members 102 and a number of horizontal members 103, which are supported by the upright members 102, and further that the second storage grid 100 comprises a rail system 108 in the X direction and Y direction. The prior art storage grid 100 further comprises storage compartments in the form of storage columns 105 provided between the members 102, 103, where storage containers 106 are stackable in stacks 107 within the storage columns 105.

Both the inventive storage grid and the prior art storage grid 100 can be of any size. In particular it is understood that the one or both of the storage grids 100,400 can be considerably wider and/or longer and/or deeper than disclosed in the accompanied figures. For example, the storage grids 100,400 may have a horizontal extent having space for more than 700×700 storage containers 106 and a storage depth of more than twelve storage containers 106.

In FIG. 7 an inventive storage grid 400 of size corresponding to 4 times 15 grid cells 422 of its respective rail system 408 is placed with one vertical side extending in the Y direction along a vertical side of a prior art storage grid 100 of size corresponding to 5 times 17 grid cells 122 of its respective rail system 108. The rail system 408 of the inventive storage grid 400 and the rail system 108 of the prior art storage grid 100 have a mutual orientation and design such that the same type of vehicles 301 may operate on both rail systems 108,408.

Again, with reference to FIG. 14, a possible coupling of the two rail systems 108,408 is shown that allows the same type of vehicles 301 to move between the two storage grids 100,400. In the particular configuration of FIG. 14, the desired coupling is achieved by an intermediate coupling rail system 408' extending in the X direction. Due to the different construction of the container frameworks 401 for the inventive storage grid 400 and the stacks 107 of storage containers 106 for the prior art storage grid 100, the rails 410,411 above the container frameworks 401 can with advantage be made wider compared to the rails 110,111 above the stacks 107, at least in one of the X-Y directions.

As shown in FIG. 7, the different container supports 402a-d may be moved a distance in the Y-direction corresponding to two grid cells by use of the displacement device 700.

Figure 11:
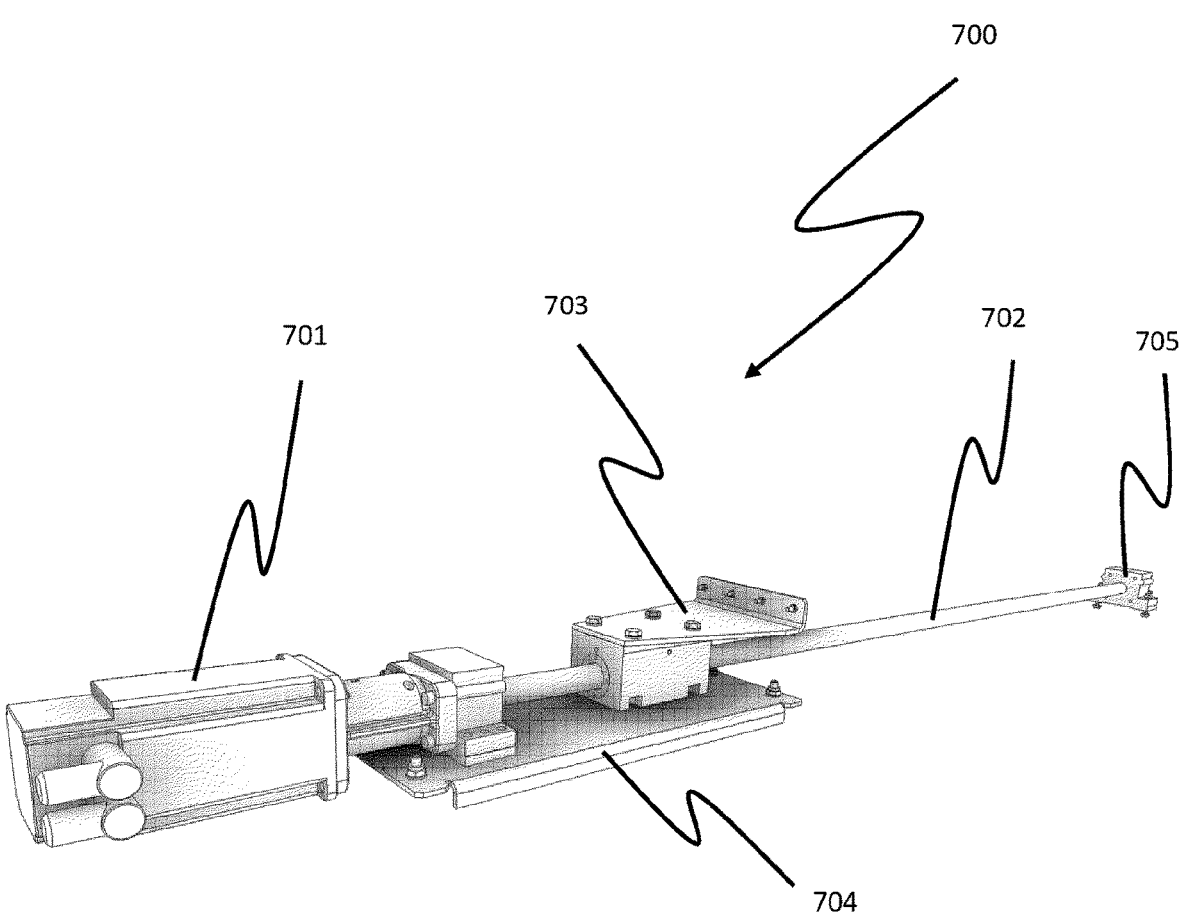
FIG. 11 is a perspective view of a linear activator for displacing the container support shown in FIG. 10.
Figure 12:
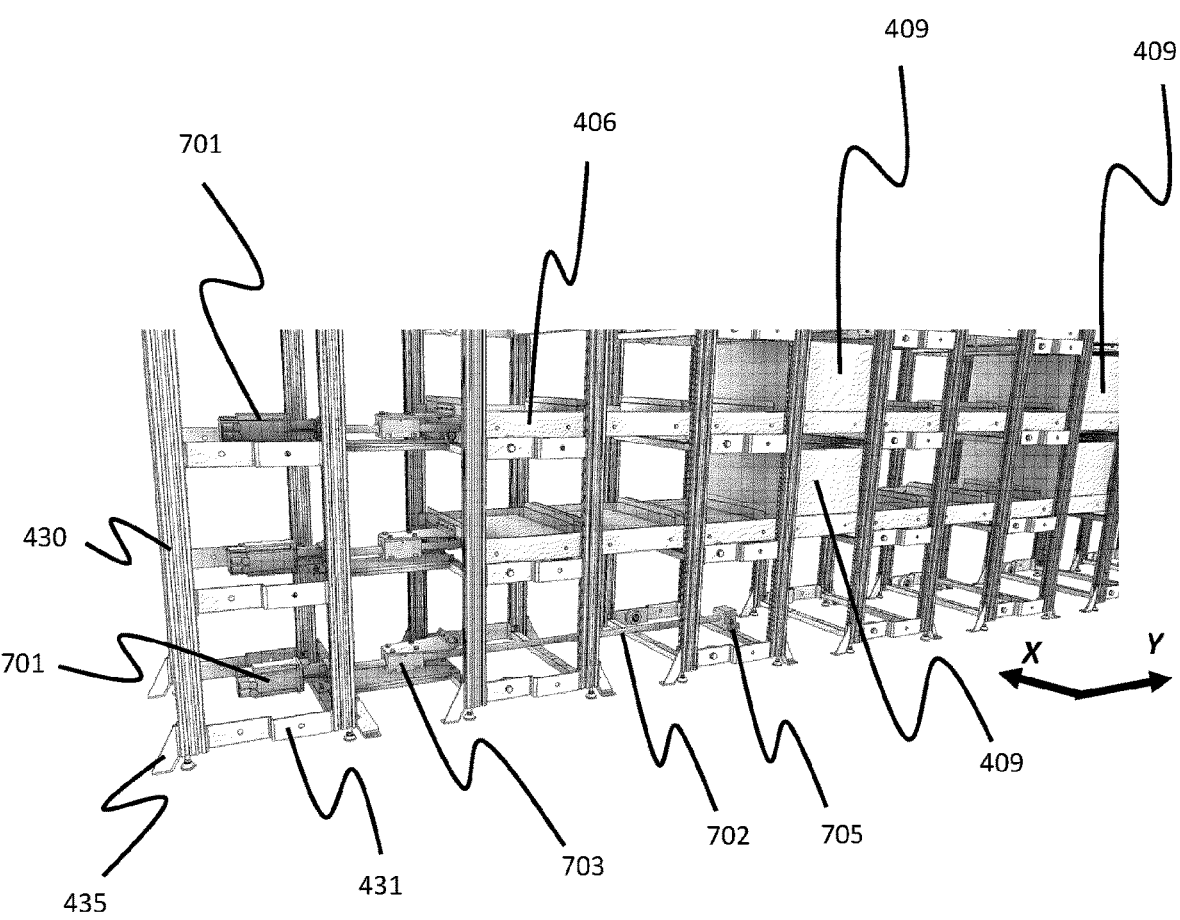
FIG. 12 is a perspective view of container supports mounted in a framework forming part of an embodiment of the invention.
Figure 13:
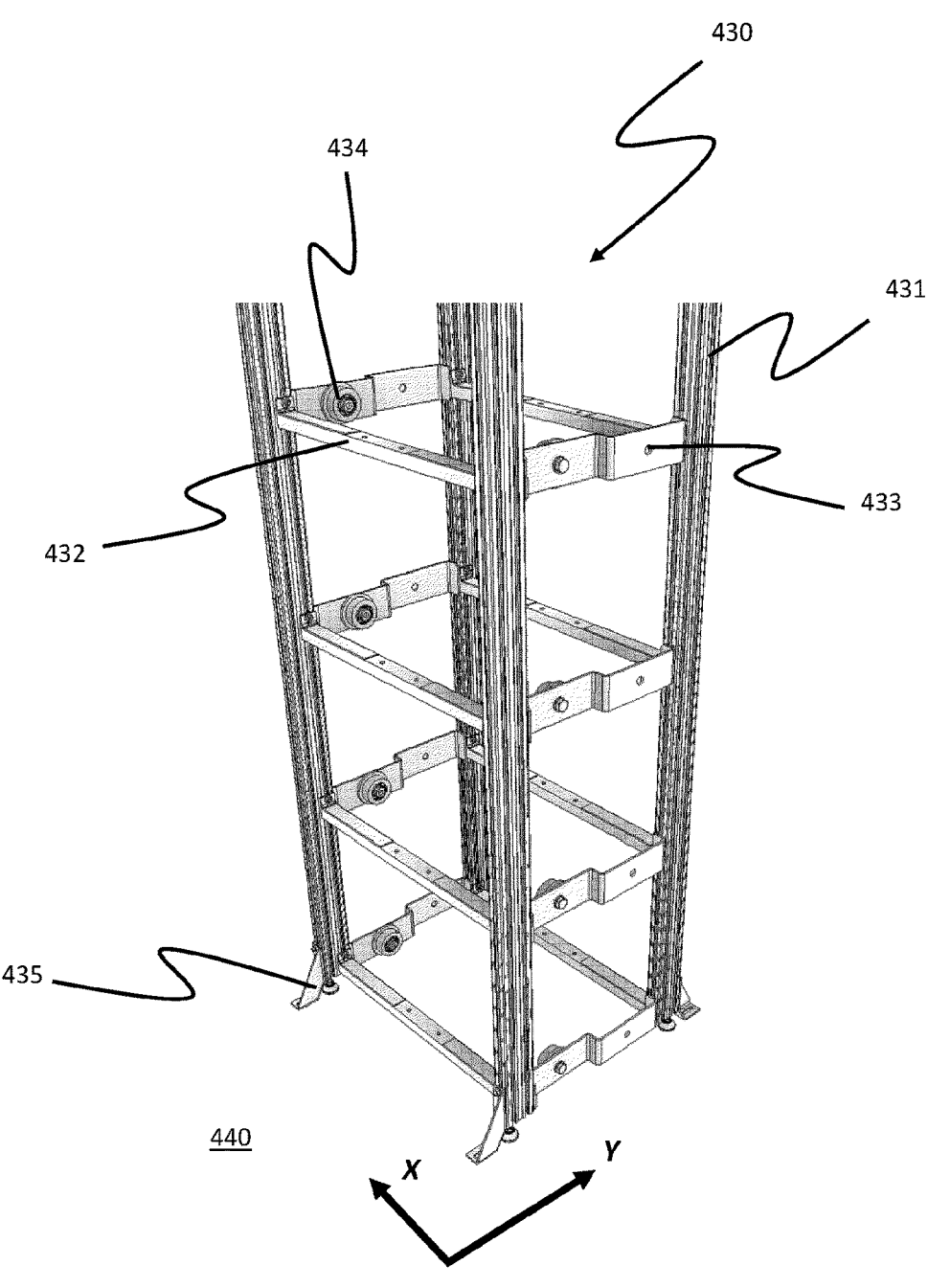
FIG. 13 is a perspective view of part of the framework shown in FIG. 12.

An example of a displacement device 700 is shown in FIG. 11 and FIG. 12. The displacement of each container support 402a-d is achieved by a mechanical linear actuator (ball screw) that translates rotational motion to linear motion. A threaded shaft 702 provides a helical raceway for ball bearings which act as a precision screw. The required rotation of the shaft is achieved by an electric motor 701 connected to one of the shaft's end. A stopper 705 is fixed to the opposite end of the shaft 702. Furthermore, a slider 703 is coupled to the rotational shaft such that it moves along the shaft 702 during rotation. By attaching the slider 703 to the end of the container support 402a-d, the desired displacement in the Y direction is achieved. The shown linear actuator 700 is fastened to a skeleton structure comprising a plurality of towers 430 having a height corresponding to the height of the storage grid excluding the rail system 408 and a horizontal extent corresponding to n×m storage container spaces, where n and m are integers of 1 or more. FIG. 13 shows an example of such a tower 430 of horizontal size 1×1. The tower 430 comprises horizontal frameworks for each vertical level of the container framework 401 set up by two rods 432 in the X direction for structural rigidity and two vertical plates 433 in the Y direction. A container support wheel 434 is rotationally fastened to the face facing inwards of both vertical plates 433. The two rods 432 and the two vertical plates 433 are fastened in rectangular form to 4 or more vertical pillars 431. The tower 430 itself is supported on the floor 440 by tower supports 435.

As best seen in FIG. 12, each container support 402 is arranged inside a row of towers 430 oriented in the Y direction. Due to the container support wheels 434, the container supports 402 may easily be displaced. The linear actuator 700 is connected to the skeleton structure of towers 430 by fixing a linear actuator support 704 between the rod 432 of the outermost tower 430 and the rod 432 of the adjacent tower 430. Further, the stopper 705 at the end distal to the electric motor 701 is fixed at a rod 432 further into the skeleton structure (for example a length corresponding to three adjacent storage container spaces as depicted in FIG. 12). The end of the container support 402 is connected to the slider 703 movable along the shaft 702, thereby render possible the desired displacement in the Y direction. Note that the container support 402 has been removed from the lowermost part of the skeleton structure to better illustrate the details.

FIG. 8 shows another configuration of the storage and retrieval system 1 comprising one prior art storage grid 100 and three inventive storage grids 400 arranged on the sides of the prior art storage grid 100 along the Y direction. The container supports 402,402a-d of each inventive storage grids 400 may be displaced in the Y direction a length corresponding to two adjacent storage container spaces (both ways). The holes 403a-c are distributed along the Y direction with a distance between corresponding to four adjacent storage container spaces. As described above for the configuration shown in FIGS. 6 and 7, the rail system 408 of the inventive storage grid 400 and the rail system 108 of the prior art storage grid 100 are mutually configured such as the same type of vehicle 301 may move between all storage grids 100,400 without human interference.

Figure 9:
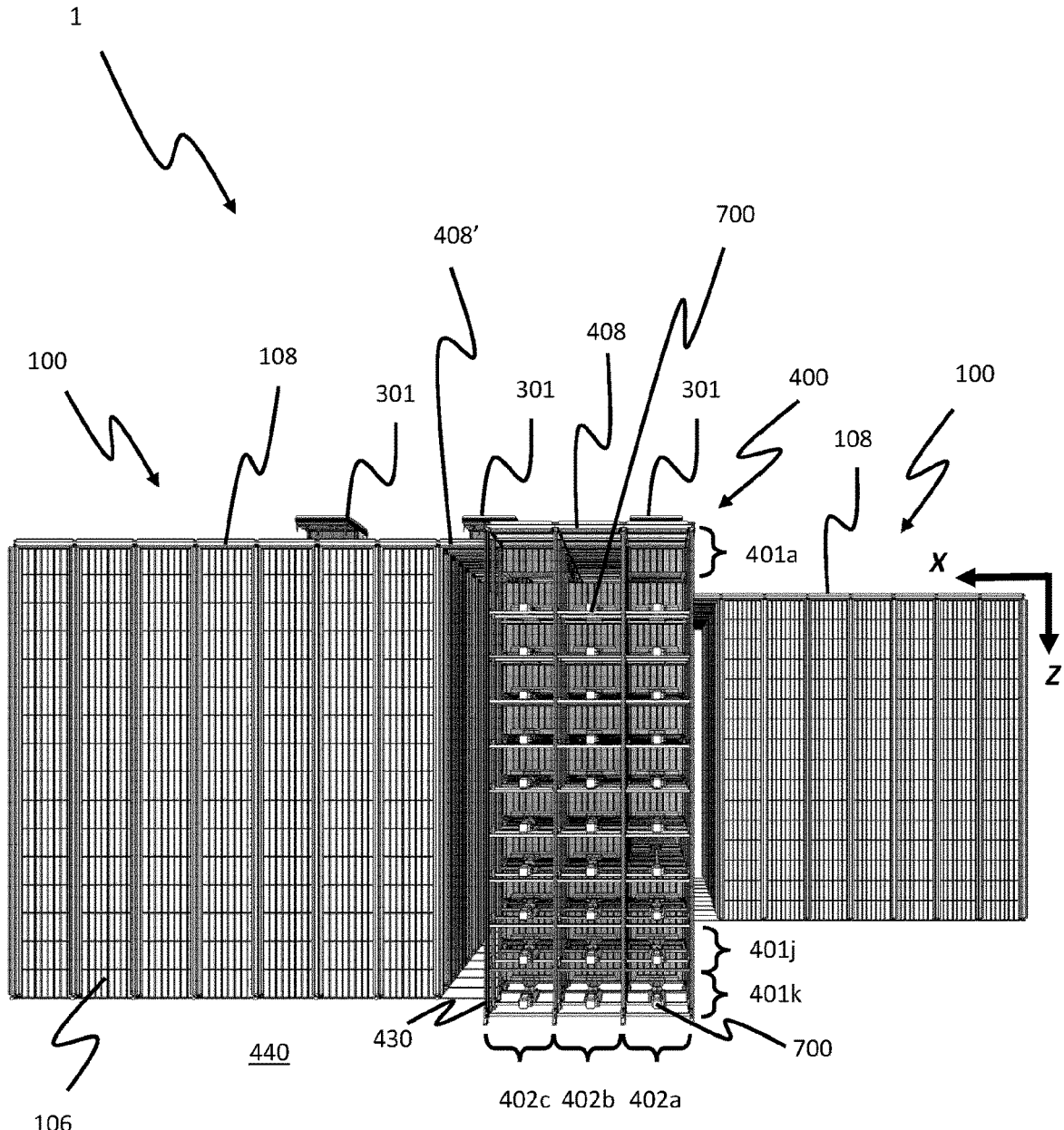
FIG. 9 is a perspective side view of a storage system in accordance with a fourth embodiment of the invention.

FIG. 9 shows a perspective view of a configuration of a storage and retrieval system 1 which is similar to the configuration shown in FIG. 8, but with one inventive storage grid 400 and several prior art storage grids 100. The above-mentioned linear actuators 700 acting as the displacement device is shown arranged at the end of each container support 402. This particular configuration comprises eleven container supporting frameworks 401a-k arranged beneath a rail system 408, each with three container supports 402a-c displaceable in the Y direction. In order to render movement between the different storage grids 100,400, a coupling rail system 408' is seen interconnecting the rail system 108 of the prior art storage grids 100 and the rail system 408 of the inventive storage grid 400. See also FIG. 14.

One way of installing the storage grid 400 as described above can be to remove all stacks of storage containers beneath a rail system of part of a prior art storage and retrieval system 1 as shown in FIG. 1, and inserting one or more inventive storage grids 400 within the empty volume.

In the preceding description, various aspects of the automated storage and retrieval system and associated method of picking product items using vehicles have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

REFERENCE NUMERALS

| | |
|---|---|
| 1 | Storage and retrieval system |
| 80 | Product items |
| 100 | Framework structure/prior art storage grid/second storage grid |
| 102 | Upright members of framework structure |
| 103 | Horizontal members of framework structure |
| 105 | Storage column |
| 106 | Storage container |
| 106' | Particular position of a storage container/target storage container |
| 106" | Vacant storage space for a storage container |
| 107 | Stack |
| 108 | Prior art rail system |
| 110 | Parallel rails in first direction (X) |
| 110a | First rail in first direction (X) |
| 110b | Second rail in first direction (X) |
| 111 | Parallel rail in second direction (Y) |
| 111a | First rail of second direction (Y) |
| 111b | Second rail of second direction (Y) |
| 115 | Grid opening |

-continued

| 119 | First port column |
|---|---|
| 120 | Second port column |
| 201 | Prior art storage container vehicle |
| 201a | Vehicle body of the storage container vehicle 101 |
| 201b | Drive means/wheel arrangement, first direction (X) |
| 201c | Drive means/wheel arrangement, second direction (Y) |
| 301 | Prior art cantilever storage container vehicle/remotely operated vehicle |
| 301a | Vehicle body of the vehicle 301 |
| 301b | Drive means in first direction (X) |
| 301c | Drive means in second direction (Y) |
| 304 | Lifting device |
| 400 | Storage system |
| 401 | Horizontal container supporting framework |
| 401a | First container supporting framework |
| 401b-k | Second/underlying container supporting framework(s) |
| 402, 402a-d | Container support |
| 403, 403a-f | Hole (in container support 402) |
| 403b' | Target hole |
| 404 | Support plate for storage container |
| 405 | First stabilization rib (for stabilizing storage containers in Y direction) |
| 406 | Second stabilization rib (for stabilizing storage containes in X direction) |
| 407 | Bracket (for fastening support plate to second stabilization frame) |
| 408 | Rail system |
| 408' | Coupling rail system |
| 409 | Guiding structure (for hole) |
| 410 | A first set of parallel rails |
| 411 | A second set of parallel rails |
| 415 | Grid opening |
| 422 | Grid cell |
| 430 | Tower |
| 431 | Vertical pillar |
| 432 | Rod |
| 433 | Vertical plate |
| 434 | Container support wheel |
| 435 | Tower support |
| 436 | Port column/chute |
| 437 | Access station |
| 440 | Floor |
| 500 | Control system |
| 700 | Support displacement device/linear actuator |
| 701 | Electric motor |
| 702 | Shaft/threaded shaft |
| 703 | Slider |
| 704 | Linear actuator support |
| 705 | Stopper |
| X | First direction |
| Y | Second direction |
| Z | Third direction |
| $P_{rs}$ | Horizontal plane |
| $W_f$ | Width of storage container |
| $L_f$ | Length of storage container |
| $H_f$ | Height of storage container |
| $V_{rI}$ | Offset between lower edge of rail system and lower edge of first container supporting framework |
| $\Delta dV$ | Offsets between lower edges of container supporting frameworks below the first container framework |

The invention claimed is:

1. A storage grid for storing storage containers, comprising a plurality of horizontal container supporting frameworks distributed vertically with vertical offsets ($\Delta dV$), wherein the plurality of horizontal container supporting frameworks comprises:

a first container supporting framework and at least one second container supporting framework arranged beneath and parallel to the first container supporting framework, wherein each of the first and the at least one second container supporting frameworks comprises a plurality of container supports arranged in parallel along a first direction, wherein each container support of the plurality of container supports displays at least one hole with an opening size being at least a maximum horizontal cross section of the storage containers to be stored and wherein at least one hole of the first container supporting framework is aligned vertically with at least one hole of the at least one second container supporting framework, and wherein at least two of the plurality of container supports of the at least one second container supporting framework are displaceable container supports of a plurality of displaceable container supports, wherein the displaceable container supports are each displaceable along a second direction orthogonal to the first direction, wherein the storage grid further comprises a rail system arranged above the first container supporting framework at a first vertical offset being at least a maximum height of the storage containers to be stored, wherein the rail system comprises a first set of parallel rails arranged in a horizontal rail system plane and extending in the first direction and a second set of parallel rails arranged in the horizontal plane and extending in the second direction, the first and second sets of rails forming a grid pattern in the horizontal plane comprising a plurality of adjacent grid cells, wherein each of the grid cells comprises a grid opening defined by a pair of adjacent rails of the first set of rails and a pair of adjacent rails of the second set of rails.

2. The storage grid in accordance with claim 1, wherein the storage grid further comprises:

a support displacement device configured to displace at least one of the plurality of displaceable container supports.

3. The storage grid in accordance with claim 2, wherein the storage grid further comprises:

a control system configured to remotely operate the support displacement device such that each of the plurality of displaceable container supports may be moved remotely and independently to the other displaceable container supports within their respective container supporting framework.

4. The storage grid in accordance with claim 1, wherein each of the plurality of container supports displays a plurality of holes distributed evenly along the second direction.

5. The storage grid in accordance with claim 1, wherein the first container supporting framework and the at least one second container supporting framework have equal or near equal horizontal extent.

6. The storage grid in accordance with claim 1, wherein each of the container supports has a length corresponding to the length of a plurality of grid cells in the second direction.

7. The storage grid in accordance with claim 1, wherein the rail system, the first container supporting framework and the at least one second container supporting framework have equal or near equal horizontal extent.

8. The storage grid in accordance with claim 1, wherein the plurality of horizontal container supporting frameworks comprises a number of i parallel container supporting frameworks, where i is an integer of 2 or more, and wherein the i parallel container supporting frameworks are arranged at a distance $dV=i*\Delta dV$ below a lower edge of the rail system, where $\Delta dV$ is a constant that is set equal or higher than a maximum height of the storage container to be stored.

9. The storage grid in accordance with claim 1, wherein each of the plurality of displaceable container supports displays a plurality of holes distributed with an offset corresponding to 2n+1 grid cells in the second direction, where n is an integer of 1 or more.

10. The storage grid in accordance with claim 1, wherein each of the plurality of displaceable container supports displays a plurality of holes distributed with an offset corresponding to n+1 grid cells in the second direction, where n is an integer of 1 or more.

11. The storage grid in accordance with claim 8, wherein the plurality of displaceable container supports are individually displaceable a distance corresponding to at least the distance of n grid cells in the second direction, where n is an integer of 1 or more.

12. The storage grid in accordance with claim 1, wherein each container support of the plurality of container supports comprises first stabilization ribs each arranged parallel to the first direction, the first stabilization ribs preventing each storage container to move along the second direction relative to the container support.

13. An automated storage and retrieval system configured to store a plurality of storage containers, comprising:

a storage grid for storing storage containers, comprising a plurality of horizontal container supporting frameworks distributed vertically with vertical offsets (ΔdV), wherein the plurality of horizontal container supporting frameworks comprises:

a first container supporting framework and at least one second container supporting framework arranged beneath and parallel to the first container supporting framework, wherein each of the first and the at least one second container supporting frameworks comprises a plurality of container supports arranged in parallel along a first direction, wherein each container support of the plurality of container supports displays at least one hole with an opening size being at least a maximum horizontal cross section of the storage containers to be stored, wherein at least one hole of the first container supporting framework is aligned vertically with at least one hole of the at least one second container supporting framework, wherein at least two of the plurality of container supports of the at least one second container supporting framework are displaceable container supports of a plurality of displaceable container supports, wherein the displaceable container supports are each displaceable along a second direction orthogonal to the first direction, wherein the storage grid further comprises a rail system arranged above the first container supporting framework at a first vertical offset being at least a maximum height of the storage containers to be stored, wherein the rail system comprises a first set of parallel rails arranged in a horizontal rail system plane and extending in the first direction and a second set of parallel rails arranged in the horizontal plane and extending in the second direction, the first and second sets of rails forming a grid pattern in the horizontal plane comprising a plurality of adjacent grid cells, wherein each of the grid cells comprises a grid opening defined by a pair of adjacent rails of the first set of rails and a pair of adjacent rails of the second set of rails:

a plurality of storage containers supported on the plurality of horizontally arranged container supporting frameworks, wherein the plurality of storage containers are supported on the plurality of horizontally arranged container supporting frameworks such that each storage container is positioned directly below a grid opening of the rail system:

a remotely operated vehicle configured to move laterally in the first direction and the second direction above the plurality of container supporting frameworks, wherein the remotely operated vehicle comprises a lifting device configured to grab and lift a storage container and a control system configured to monitor and control wirelessly movements of the remotely operated vehicle, wherein the remotely operated vehicle is configured to move laterally in the first direction and the second direction on the rail system and to lift the storage container through the grid opening by use of the lifting device.

14. The automated storage and retrieval system in accordance with claim 13, wherein the system further comprises:

a second storage grid comprising:

a second rail system comprising a first set of parallel rails arranged in the horizontal rail system plane ($P_{rs}$) and extending in the first direction and a second set of parallel rails arranged in the horizontal rail system plane ($P_{rs}$) and extending in the second direction which is orthogonal to the first direction, the first and second sets of rails forming a grid pattern in the horizontal plane ($P_{rs}$) comprising a plurality of adjacent grid cells, wherein each of the grid cells comprises a grid opening defined by a pair of adjacent rails of the first set of rails and a pair of adjacent rails of the second set of rails and a plurality of stacks of storage containers arranged in storage columns located beneath the second rail system, wherein each storage column is located vertically below a grid opening; and wherein the remotely operated vehicle is configured to also move laterally on the second rail system.

15. The automated storage and retrieval system in accordance claim 14, wherein the system further comprises a coupling rail system comprising rails extending in at least one of the first direction and the second direction and configured such the remotely operated vehicle may move between the rail system of the storage grid and the second rail system of the second storage grid.

16. A method for storing and retrieving storage containers from an automated storage and retrieval system in accordance with claim 13, wherein the plurality of horizontal container supporting frameworks comprises a number of i parallel container supporting frameworks, where i is an integer of 2 or more, wherein the method comprises:

A. moving the remotely operated vehicle to a position where its lifting device is positioned in vertical alignment above either a target storage container supported on the first container supporting framework or, if the target storage container is situated on one of the i−1 parallel container support frameworks in vertical alignment beneath the first container supporting framework, a target hole of the first container supporting framework located horizontally closest to the target storage container, B. if the target storage container is not positioned in vertical alignment below the target hole, a) displacing the displaceable container support of the supporting framework onto which the target storage container is supported in the second direction to position the target storage container in vertical alignment below the target hole of the first container supporting framework or b) if at least one of the plurality of container supports of the first container supporting framework are displaceable along the second direction, displacing the one or more displaceable container supports of the one or more container support frameworks situated above the target storage container supporting displaceable container support, where one of the displaceable container support(s) of each of the above situated container supporting framework(s) has the same position in the first direction as the target storage container supporting displaceable container support, a distance in the second direction opposite of the direction in a) to position the target storage container in vertical alignment below the target hole of the first container supporting framework or c) if at least one of the plurality of container supports of the first container supporting framework are displaceable along the second direction, displacing both the target storage container supporting displaceable container support as described in step a) and the above arranged one or more displaceable container supports as described in step b) to position the target storage container in vertical alignment below the target hole, C. lowering, grabbing, and lifting the target storage container by use of the lifting device and D. moving the remotely operated vehicle with the target storage container to another horizontal location.

17. The method in accordance with claim 16, wherein the storage grid further comprises a rail system arranged above and adjacent to the first container supporting framework at a first vertical offset ($V_{r1}$) being at least a maximum height of the storage containers to be stored, wherein the plurality of storage containers are supported on the plurality of horizontally arranged container supporting frameworks such that each storage container is positioned directly below a grid opening of the rail system and wherein the remotely operated vehicle is configured to move laterally in the first direction and the second direction on the rail system and to lift the storage container through the grid opening by use of the lifting device.

18. Use of an automated storage and retrieval system in accordance with claim 13 for delivering items arranged within the storage containers stored in the storage grid to end users.

\* \* \* \* \*